March 19, 1963 J. J. KOTLIN ET AL 3,081,755
CYLINDER HEAD FOR INTERNAL COMBUSTION ENGINE
Filed Nov. 29, 1960 3 Sheets-Sheet 1

INVENTORS
James J. Kotlin &
BY James R. Ware

E. C. James
ATTORNEY

March 19, 1963 J. J. KOTLIN ET AL 3,081,755
CYLINDER HEAD FOR INTERNAL COMBUSTION ENGINE
Filed Nov. 29, 1960 3 Sheets-Sheet 2

INVENTORS
James J. Kotlin &
BY James R. Ware

E. E. James
ATTORNEY

March 19, 1963  J. J. KOTLIN ET AL  3,081,755
CYLINDER HEAD FOR INTERNAL COMBUSTION ENGINE
Filed Nov. 29, 1960  3 Sheets-Sheet 3

INVENTORS
James J. Kotlin &
BY James R. Ware

E. E. James
ATTORNEY

United States Patent Office 3,081,755
Patented Mar. 19, 1963

1

3,081,755
CYLINDER HEAD FOR INTERNAL COM-
BUSTION ENGINE
James J. Kotlin, Downers Grove, and James R. Ware,
Hinsdale, Ill., assignors to General Motors Corporation,
Detroit, Mich., a corporation of Delaware
Filed Nov. 29, 1960, Ser. No. 72,507
12 Claims. (Cl. 123—41.77)

This invention relates to internal combustion engines; more particularly to cylinder structure for such engines; and with regard to certain more specific aspects thereof to a cylinder head for a valve-in-head uniflow scavenged fuel injection engine of the compression ignition type.

The various combustion chamber defining surfaces and walls of an internal combustion engine are subjected to severe cyclic mechanical and thermal loads due to the extreme rapid changes in pressure and temperature which are alternately and unevenly imposed on the chamber defining surfaces by the sequential compression, combustion and inflow of relatively cool charging air occurring within the cylinder during the engine operating cycle. These changes in pressure and surface temperature result in the cyclic imposition of expansive compressive and contractive tensive stresses on the chamber defining surfaces and walls. In time, this cyclic stressing often results in fatigue cracking of the combustion chamber defining surfaces with subsequent progressing of such surface cracks through the walls. Such cracking generally occurs intermediate and adjacent valve seat, spark plug and injector mounting ports or openings where the stress inducing thermal differentials are the greatest and where the surfaces and walls are of minimum dimension. Such cracking is generally prevalent in those applications where the engine is subjected to extreme fluctuations in load and speed; factors which result in sudden applications of relatively cool incoming air onto overheated cylinder defining surfaces.

The uneven application of combustion induced thermal conditions (temperatures) to the combustion chamber defining surfaces and the uneven cooling of the combustion chamber defining wall further tend to produce ovalizing distortion of the valve-supporting structure and valve seating ports. Such distortion generally results in undesirable valve operation, uneven pounding of the valve seating surfaces, gas leakage or blowby with initial loss of engine compression and combustion efficiency, and in eventual cracking, erosion and burning of the valve head and seat.

This invention contemplates an improved cylinder structure providing equalized cooling of the valve seat defining combustion chamber wall, minimizing the cyclic stresses imposed on the combustion chamber wall intermediate the valve seat and injector mounting ports and preventing ovalizing distortion of the valve seat structure. With reference to certain of its more specific aspects, the invention contemplates an improved cylinder head structure for a valve-in-head uniflow scavenged fuel injection engine of the compression ignition type.

The foregoing and other objects, advantages and features of the invention will be apparent from the following description of several illustrative cylinder head structures having reference to the accompanying drawings in which.

Figure 2:
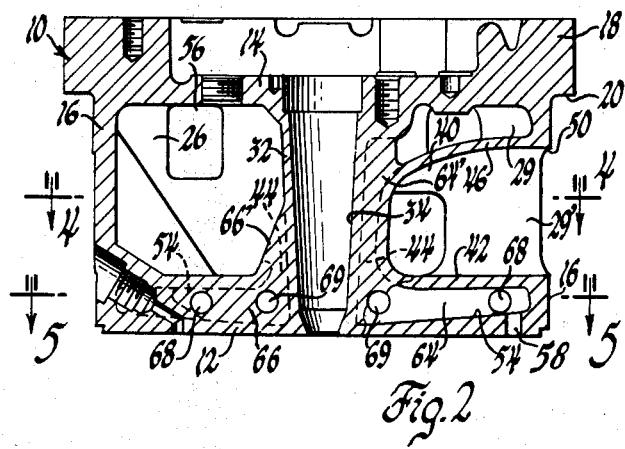
FIGURES 2 and 3 are sectional views of the cylinder head of FIGURE 1 and are taken substantially in the direction of the arrows and in the planes of the lines indicated at 2—2 and 3—3, respectively, of FIGURE 1.
Figure 3:
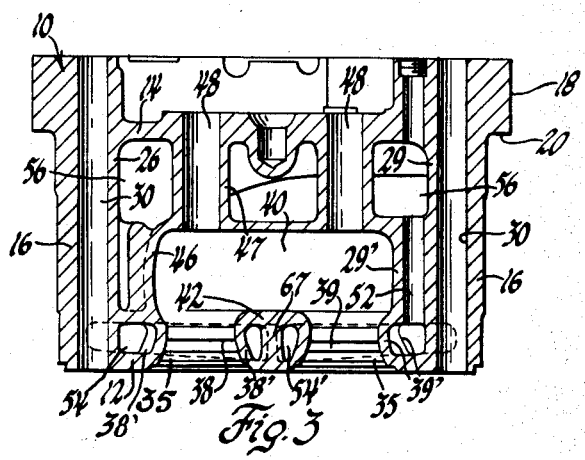
Figure 4:
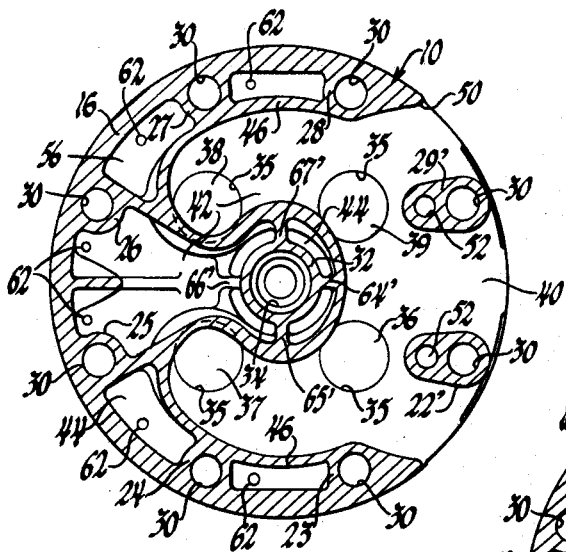
FIGURES 4 and 5 are sectional views taken substantially in the direction of the arrows and in the planes of the lines indicated respectively at 4—4 and 5—5 of FIGURE 2.
Figure 5:
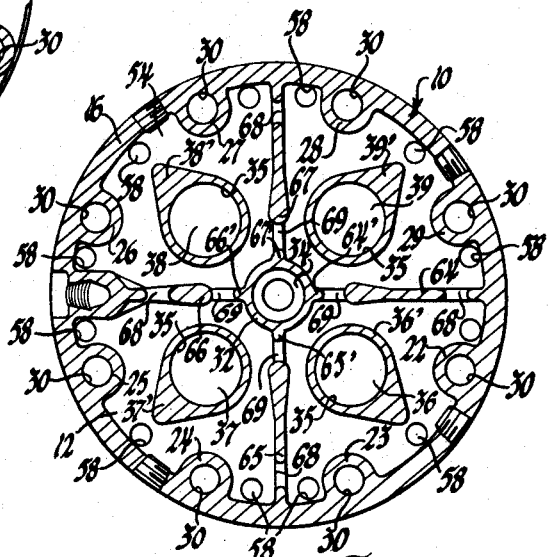
Figure 6:
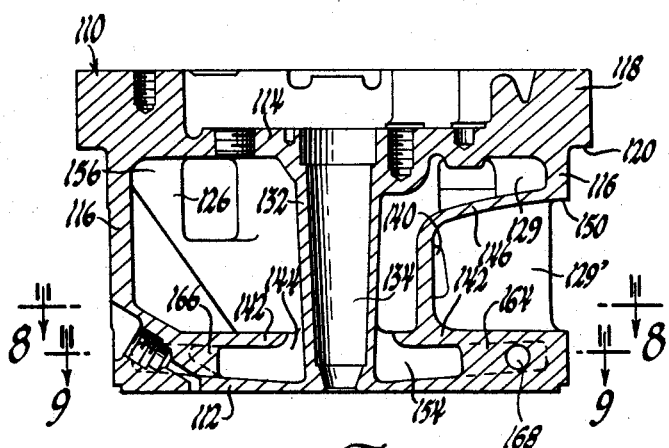
Figure 7:
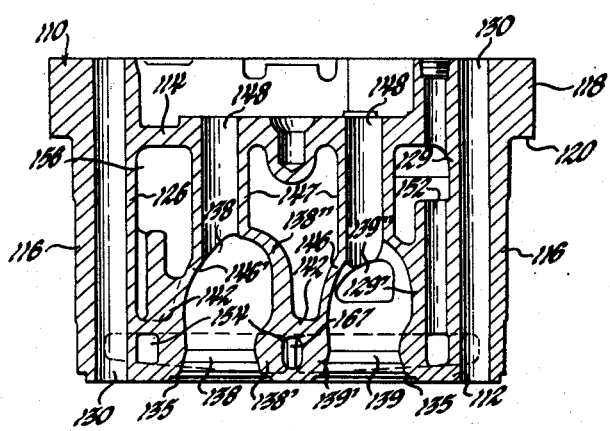
Figure 8:
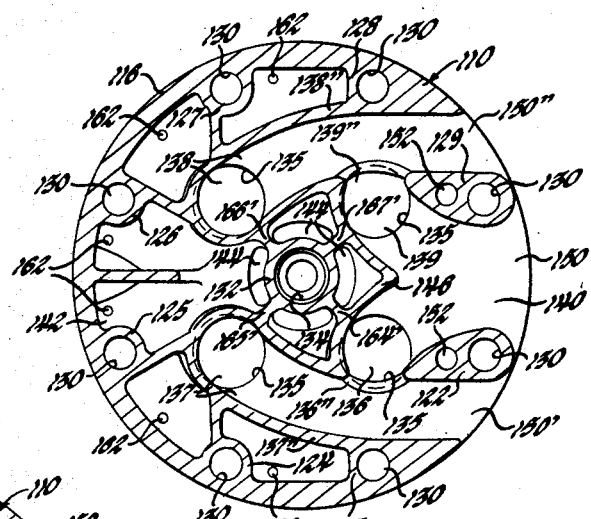
Figure 9:
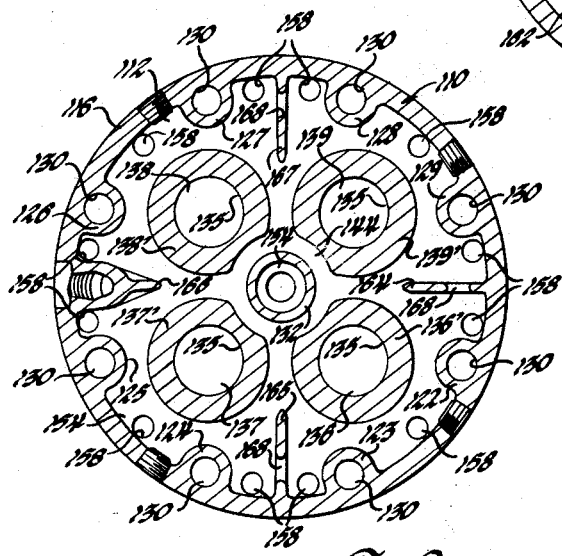

FIGURES 6 and 7 are sectional views similar to FIGURES 2 and 3 and show a modified form of the invention; and FIGURES 8 and 9 are sectional views similar to FIGURES 4 and 5 and show the modified form of the invention as taken substantially in the direction of the arrows and in the plane of the lines indicated at 8—8 and 9—9, respectively, in FIGURE 6.

Referring more particularly to the drawings, a cylinder head illustrative of the first embodiment of the invention is indicated generally by the reference numeral 10 in FIGURES 1-5. In accordance with certain more specific aspects of the invention, this cylinder head is intended for use in a uniflow-scavenged two-cycle engine of a fuel injection, compression ignition type. The head 10 is particularly adapted to be secured in end sealing engagement to the upper end of a jacketed liquid-cooled cylinder liner and to be mounted therewith in a cylinder mounting bore of an engine frame member in the manner shown and described in United States Patents 2,389,051, Kettering, and Church, 2,054,928. As in the patented disclosures, the cylinder head 10 cooperates with a piston reciprocably mounted in the liner to define an expansible combustion chamber therebetween.

The cylinder head 10 comprises a lower combustion chamber defining deck or wall 12 engageable outwardly with the upper end of the associated jacketed liner. An upper deck 14 extends in spaced parallel relation to the lower deck and is connected thereto by a peripheral side wall 16. A flange 18 is coextensive with and extends upwardly and outwardly of the upper wall 14 and the side wall 16 to provide an annular shoulder 20. In mounting the cylinder assembly within the opening provided therefor in the engine frame, this flange defined shoulder of the cylinder head is sealingly engageable with a mating shoulder provided therefor in the engine frame as shown in the patents mentioned above. The side wall 16 and flange 18 are structurally reinforced by a plurality of spaced vertically extending bosses 22, 23, 24, 25, 26, 27, 28, 29. These bosses define a plurality of bolt holes 30 which are adapted to receive through bolts for securing the cylinder head to the jacketed cylinder liner. The upper and lower decks are interconnected centrally of the head by a sleeve defining wall portion 32. This sleeve defining wall provides a central opening 34 extending through the cylinder head. This opening is of stepped and tapered diameters and adapted to mount a suitable fuel injection device.

Four valve seat defining exhaust ports extend through the combustion chamber wall of the head in equispaced relation about the injector mounting opening. These exhaust ports communicate upwardly through short branch passages 36, 37, 38 and 39 with a common exhaust passage or chamber 40. These branch passages are defined by wall portions 36', 37', 38' and 39' which extend upwardly between the combustion chamber wall 12 and a partition wall 42. This partition wall extends inwardly from the side wall 16 in spaced parallel relation above the combustion chamber wall and terminates inwardly in radially spaced relation to the injector mounting tube or wall 32 thus defining an annular port 44 opening upwardly therebetween.

The exhaust passage 40 is defined between the partition wall 42 and an upper passage wall 46. This upper passage defining wall 46 is structurally connected to the upper head wall 14 by four tubular or cylindrical wall portions 47 which extend therebetween in axial alignment with the several valve seating ports 35 and define bores 48 adapted to receive suitable valve guide bushings.

As best seen in FIGURE 4, the exhaust passage 40 extends arcuately of the head, partially embracing the injector mounting sleeve in spaced relation thereto and intersecting the several valve controllable branch passages 36–39, and communicates laterally outwardly with an exhaust outlet port 50 opening through the side wall 16 of the head. This outlet port is connectable to an exhaust manifold through a suitable branch passage. Such a branch passage may be provided in the engine frame as shown in the above mentioned Church patent. The port opening 50 is vertically intersected by two struts 22' and 29'. These struts are coextensive with the bolt hole defining bosses 22 and 29 and each has a passage 52 extending therethrough. The passages 52 permit the circulation of a cooling fluid through the exhaust gas exposed struts 22' and 29'.

Figure 1:
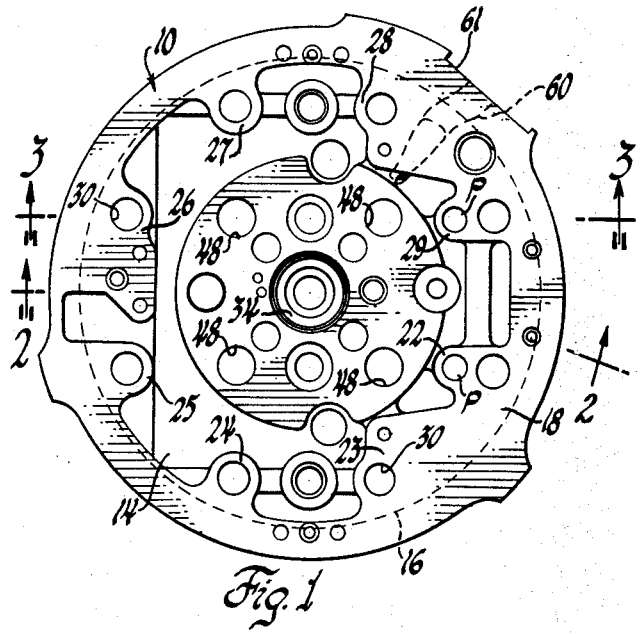
FIGURE 1 is a top elevational view of a cylinder head embodying the invention.

It will be seen that the partition and exhaust passage defining walls cooperate with the outer walls of the head to define a coolant receiving compartment. This compartment is divided by the partition wall 42 into a lower jacket chamber 54 and an upper jacket chamber 56. These chambers are interconnected through the injector embracing port or passage 44. The cooling fluid is forced or drawn upwardly into the lower chamber through a plurality of ports 58 which are spaced and extend through the lower head wall 12 adjacent the side wall 16. The ports 58 mate with corresponding ports provided in the jacketed cylinder liner structure which is connected in a conventional manner to the discharge of a coolant circulating pump. As shown in FIGURE 1, the upper flange portion 18 has an outlet passage 60 opening inwardly on the upper chamber 56 and outwardly on a machined side face 61 thereof. This outlet passage is connectable through a suitable fitting and a water outlet manifold to the inlet of the coolant circulating pump in a conventional manner. The water outlet or return manifold may be formed integrally of the engine frame to embrace the frame defined branch exhaust passages as shown in the above mentioned Church patent. In addition to the injector embracing port 44 and the strut cooling passages 52, the upper and lower chambers are interconnected through a plurality of flow restricting ports 62 which extend through the partition wall in substantial alignment with the water inlet ports 58 located on the side of the head opposite the exhaust outlet port 50.

Four partition webs 64, 65, 66 and 67 extend radially of the head subdividing the lower jacket chamber 54 and structurally reinforcing the combustion chamber and partition walls 12 and 14 between the several branch passages 36 and 39. It will be seen that these webs divide the lower jacket portions into quadrant portions each embracing one of the branch exhaust passage defining walls 36'–39'. These webs also extend upwardly at 64', 65', 66' and 67' subdividing the injector embracing passage 44 and structurally reinforcing the injector mounting tube with respect to the partition and exhaust passage defining walls 42 and 46. Each quadrant portion of the combustion chamber wall 12 has three of the water inlet ports 58 opening therethrough adjacent the corresponding quadrant defining portion of the side wall 16. Two of these ports are disposed at opposite ends of the quadrant chamber portion adjacent the quadrant defining partition walls. The third port is disposed radially outwardly of the branch passage defining wall in a plane radially bisecting its particular quadrant. The several partition webs 64–67 are perforated inwardly and outwardly of the lower chamber at 68 and 69, respectively, and serve to equalize coolant flow inwardly through the several quadrant portions of the lower jacket chamber and upwardly into the upper jacket chamber 56 through the several portions of the passage 44.

Due to the dimensional restriction provided, a relatively high velocity of flow is achieved as the coolant passes inwardly through the several quadrant portions of the lower jacket chamber between the branch exhaust passages and the partition webs and upwardly of the injector embracing passage. A relatively high velocity scrubbing action is thus provided within these chamber and passage portions thereby insuring maximum cooling of the combustion chamber defining wall and of the injector mounting tube. The velocity of coolant flow is substantially reduced, however, upon entering the relatively unrestricted upper jacket chamber 56. This flow of coolant within the upper chamber is augmented by the coolant flowing upwardly through the strut cooling passages 52 and is agitated by jets of cooling fluid emitting through the several partition wall ports 62. Such agitation prevents stratification of the coolant within the upper chamber and insures adequate cooling of the exhaust passage defining wall 46.

As indicated above, the combustion chamber defining surface of the cylinder head is subjected to the extreme cyclic temperature changes occurring within the combustion chamber. The resultant cyclic differentials or variations in surface temperature are of maximum intensity centrally of the combustion chamber surface of the head and decrease outwardly adjacent the combustion chamber side walls due to flame radiation factors, imperfect scavenging, and radiation and conduction to the relatively cool adjacent portions of the cylinder and head. Such surface temperature variations result in a relatively plastic flow of the alternately heated and cooled combustion chamber surface and of a limited layer of metal immediately adjacent thereto setting up cyclic expansive compression and contractive tension stresses in this layer of the combustion chamber wall. The remainder of the combustion chamber defining wall is of course subjected to substantially steady state thermal and heat transfer conditions. Such steady state thermal conditions establish expansive compressive stresses within this remainder of the combustion chamber wall. These cyclic and steady state stresses are of maximum resultant intensity centrally of the combustion chamber defining wall. The resultant stresses are particularly concentrated in the reduced dimensional portions of the combustion chamber wall between the several valve and injector mounting ports where they tend to initiate fatigue cracking of the combustion chamber surface layer portion with eventual progressive cracking through the remainder of the combustion chamber wall.

In the embodiment of the invention shown in FIGURES 1–5, the combustion chamber defining wall 12 is tapered inwardly from the side wall 16 to a central portion of reduced wall thickness intermediate the several valve and injector mounting ports. This tapered and reduced wall thickness cooperates with the variations in coolant flow velocity to progressively increase heat transference radially of the combustion chamber wall. The resultant heat transfer characteristics of the tapered combustion chamber wall reduce the boundary temperatures between the surface layer and steady state heat transfer wall portions and reduce the thickness of the surface layer portion subjected to cyclic thermal conditions in the critical central region between the several valve and the end injector mounting ports. These heat transfer characteristics also tend to reduce the boundary temperatures between the surface layer and steady state heat transfer wall portions in the critical central region substantially to or slightly below the corresponding boundary temperatures in the outer portions of the combustion chamber defining wall. These factors serve to reduce the thermal stress conditions imposed on the critical reduced dimensional portions of the combustion chamber wall between the several valve and injector mounting ports.

As best seen in FIGURE 3, the provided tapering of the combustion chamber wall obliquely intersects the several valve seat and exhaust passage defining walls 36'–39'. This tapered variation in the valve seat, exhaust port defining wall thickness cooperates with ovate tapering of the branch exhaust passage defining walls 36'–39', as best seen in FIGURE 5, to further equalize heat transference from these valve seat, exhaust port defining wall portions. The tapered outer portion of the ovoid-sectioned branch passage walls serves the further purpose of equally dividing coolant flow through the quadrant portions of the lower jacket chamber. The resultant balancing or equalizing of heat transference from the port defining periphery prevents thermal distortion or ovalizing of the port defined valve seat.

The cylinder head of the embodiment of FIGURES 6–9 is similar in design and application to that of the previously described embodiment of the invention except for certain variations which are described in greater detail below and relate to the exhaust passage arrangement, the coolant flow dividing partitioning and in the tapering of the combustion chamber defining wall. Hence, portions of this modified cylinder head are identified by reference numerals obtained by adding 100 to the several reference numerals used in describing corresponding portions of the previously described cylinder head construction. Thus the last two digits of such corresponding reference numerals are the same. By way of an example, the cylinder head of the second embodiment is identified by the reference numeral 110 and the combustion chamber defining wall is identified by the reference numeral 112.

In contrast to the head structure described above, the lower exhaust passage defining walls 136'–139' are of substantial and constant radial thickness except for limited relieved portions concentrically and spacedly embracing the injector mounting tube 132. This thicker exhaust passage wall configuration cooperates with a somewhat more pronounced taper in the combustion chamber defining wall thickness and with limited flow dividing partition walls or webs 164–167 to increase the velocity of coolant flow inwardly of the lower jacket chamber 154, to equalize cooling of the several valve seat defining ports 135 and to reduce the cyclic and steady state thermal stress loads imposed on the combustion chamber defining wall and particularly in the critical wall portions between the injector mounting and the several exhaust ports.

As best seen in FIGURE 8, the exhaust passage arrangement of the instant head is intended to reduce turbulance within the several exhaust passage portions of the head and to minimize exhaust pulse interferences between the several valve controlled ports. In this arrangement, the lower branch passages 136 and 139 communicate upwardly and laterally outwardly through a common passage 140 to a port 150 opening through the side wall 116. The passage 140 is defined between the lower partition wall 142, an upper passage defining wall 146 and the bolt hole defining struts 122 and 129. The passages 137 and 138 extend upwardly and laterally of the head in outboard relation to the passage 140 to outlet ports 150' and 150" flanking the port 150. The upper portions of these two passages are defined by the partition wall 142, upper passage defining walls 137" and 138" and the struts 122 and 129, respectively. These outboard passages provide substantially separate and unrestricted flow paths serving their respective ports but may be connected as shown to the central passage 140 through limited ports 136" and 139".

While the foregoing description of the invention has been limited to two illustrative embodiments, various modifications and changes might be made therein without departing from the spirit and scope of the invention as defined in the following claims.

We claim:

1. A member of an internal combustion engine defining a coolant jacket compartment and having a combustion chamber defining wall, said member having passage defining walls extending through said jacket compartment and terminating in a plurality of ports opening through said combustion chamber defining wall in spaced relation to each other, said combustion chamber defining wall having a portion of reduced thickness intermediate the several passage terminating ports, a partition wall extending in closely spaced parallel relation to said combustion chamber defining wall and dividing said jacket compartment into a flow restricting lower jacket chamber and an upper relatively unrestricted jacket chamber, said upper chamber having an outlet opening connectable to coolant circulating means, said partition wall intersecting and having an opening therethrough centrally of said passage defining walls, said combustion chamber defining wall having a plurality of coolant inlet ports spaced peripherally outwardly thereof and adapted to introduce coolant into said lower jacket chamber, said inlet ports being connectable through said coolant circulating means to the outlet opening from said upper chamber, and partition means extending radially between the passage defining walls within said lower chamber and cooperating with said inlet ports and said passage walls to equalize and to increase the velocity of coolant flow inwardly therebetween, thereby increasing heat transfer and minimizing the expansive and contractive thermal stress loads of the reduced thickness combustion chamber defining wall portion intermediate the several valve ports.

2. A cylinder head member for an internal combustion engine, said cylinder head defining a coolant jacket compartment and having a combustion chamber defining end wall portion, passage defining walls extending through said jacket compartment and terminating in a plurality of valve controllable ports equiangularly spaced and opening on the combustion chamber surface of said end wall portion, said head having a coolant outlet port opening centrally of said valve ports and connectable to coolant circulating means and having a plurality of coolant inlet ports spaced and opening peripherally of said jacket compartment, said inlet ports being connectable through said coolant circulating means to said outlet port, said end wall portion being tapered inwardly thereof to a portion of reduced wall thickness intermediate the several passage openings, and partition means within said jacket compartment for equalizing and increasing the velocity of coolant flow inwardly over the combustion chamber wall portion between the adjacent ends of said passage defining walls, said partition means and the tapering of said wall portion cooperating with the increasing inward coolant flow velocity to increase heat transfer inwardly of said wall portion thereby equalizing the cooling of the several valve ports and minimizing the expansive and contractive thermal stress loads imposed on the combustion chamber defining wall portion intermediate the several valve ports.

3. A member of an internal combustion engine defining a coolant jacket compartment and having a combustion chamber defining wall, said member having exhaust passage defining walls extending through said jacket compartment and terminating in a plurality of valve controllable ports opening through said combustion chamber defining wall in spaced relation to each other, a partition wall extending in closely spaced parallel relation to said combustion chamber defining wall and dividing said jacket compartment into a flow restricting lower jacket chamber and an upper relatively unrestricted jacket chamber, said upper chamber having a coolant outlet port connectable to coolant circulating means, said partition wall intersecting said pasage defining walls and having an opening therethrough spaced centrally of the valve controllable ports in said combustion chamber defining wall, said member having a spaced plurality of coolant receiving inlet ports opening into the outer periphery of the lower jacket chamber, said inlet ports being connectable through the coolant circulating means to the upper chamber outlet port and cooperating with said partition wall and the opening therethrough to provide coolant flow inwardly of the lower jacket chamber, said combustion chamber defining wall being tapered inwardly of the lower jacket chamber to a reduced thickness between the several passage terminating ports, the passage defining walls exposed to the coolant within the lower jacket chamber being ovate in cross section in a plane parallel to said combustion chamber defining wall, said passage defining walls being of maximum wall thickness radially outwardly of said member, and radially extending partition means cooperating with the passage defining walls within the lower jacket chamber to equalize and increase the velocity of coolant flowing inwardly therebetween, thereby increasing heat transfer inwardly of said combustion chamber defining wall and minimizing the expansive and contractive thermal stress loads imposed on the portions of this wall intermediate the several valve ports.

4. A member of an internal combustion engine defining a coolant jacket compartment and having a combustion chamber defining wall, said member having exhaust passage defining walls extending through said jacket compartment and terminating in a plurality of valve controllable ports opening through said combustion chamber defining wall in spaced relation to each other, a partition wall extending in closely spaced parallel relation to said combustion chamber defining wall and intersecting said passage defining walls, said partition wall dividing said jacket compartment into a flow restricting lower jacket chamber and an upper relatively unrestricted jacket chamber and having an interconnecting opening therethrough centrally of said passage defining walls, said upper chamber having an outlet port connectable to coolant circulating means, said member having a plurality of coolant inlet ports spaced and opening into the outer periphery of the lower jacket chamber, said coolant inlet ports being connectable through said coolant circulating means to the outlet port from said upper chamber and cooperating with the partition wall and the opening therethrough to provide coolant flow inwardly of the lower jacket chamber over the combustion chamber defining wall, said passage defining walls extending through the lower jacket chamber being ovate in cross section in a plane parallel to said combustion chamber defining wall, said passage defining walls being of minimum thickness radially inwardly of said member and of maximum thickness radially outwardly of said member, and radially extending partition means extending between and cooperating with the passage defining wall portions within the lower jacket chamber to equalize and increase the velocity of coolant flowing inwardly therebetween, thereby increasing heat transfer inwardly of said combustion chamber defining wall and minimizing the expansive and contractive thermal stress loads imposed on portions of this wall intermediate the several valve ports.

5. A member of an internal combustion engine defining a coolant jacket compartment and having a combustion chamber defining wall, said member having passage defining walls extending through said jacket compartment and terminating in a plurality of ports opening through said combustion chamber defining wall in spaced relation to each other, said combustion chamber defining wall being tapered to a portion of reduced thickness intermediate the several passage terminating ports, a partition wall extending in closely spaced parallel relation to said combustion chamber defining wall and dividing said jacket compartment into a flow restricting lower jacket chamber and an upper relatively unrestricted jacket chamber, said upper chamber having an outlet opening connectable to coolant circulating means, said partition wall intersecting said passage defining walls and having an opening therethrough spaced from said passage terminating ports, said member having a spaced plurality of coolant receiving inlet ports opening into the lower jacket chamber and connectable through said coolant circulating means to the outlet opening from said upper chamber, said inlet ports being spaced from the reduced thickness wall portion and adapted to direct coolant flow between the passage defining walls within the lower jacket chamber and toward said partition wall opening, and partition means extending radially between the passage defining walls within said lower chamber to equalize and increase the velocity of coolant flow therebetween, thereby increasing heat transfer and minimizing the expansive and contractive thermal stress loads imposed on the reduced thickness of the combustion chamber defining wall portion intermediate the several valve ports.

6. A member of an internal combustion engine defining a coolant jacket compartment, said member having a first combustion chamber defining wall, said member having exhaust passage defining walls extending through said jacket compartment and terminating in a plurality of valve controllable ports opening through said first wall in spaced relation to each other, a second wall extending in closely spaced parallel relation to said first wall and intersectiong said passage defining walls, said second wall having a coolant outlet port opening therethrough centrally of the valve controllable ports and connectable to coolant circulating means, said member having a plurality of coolant inlet ports spaced and opening peripherally of said jacket compartment and connectable through said coolant circulating means to the coolant outlet port, said first wall being tapered toward said coolant outlet port and the adjacent passage defiing walls being of maximum thickness radially outwardly of said member and reduced to a minimum thickness radially inwardly thereof, and partition means extending radially of said compartment and cooperating with the passage defining walls therein to equalize and increase the velocity of coolant flowing inwardly of the combustion chamber defining wall between the passage defining walls, said partition means and the tapering of said combustion chamber defining wall and said passage defining walls cooperating with the increasing inward coolant flow velocity to increase heat transfer inwardly of said wall thereby equalizing the cooling of the several valve ports and minimizing the expansive and contractive thermal stress loads imposed on the combustion chamber defining wall intermediate the several valve ports.

7. A member of an internal combustion engine defining a coolant receiving jacket compartment and having a combustion chamber defining wall, a wall portion adapted to mount a fuel injector extending through said jacket compartment and opening on said combustion chamber defining wall, said member having a partition wall extending transversely within said member in closely spaced parallel relation to said combustion chamber defining wall and dividing said jacket compartment into a flow restricting lower jacket chamber and an upper relatively unrestricted jacket chamber, said member having a coolant outlet port opening to said upper jacket chamber and connectable to coolant circulating means, said partition wall having an opening therethrough spacedly embracing the injector mounting wall portion, said member having exhaust passage defining walls extending through said jacket compartment and spacedly embracing a portion of said injector mounting wall portion to define a restricted coolant passage between said jacket chambers, said exhaust passage defining walls terminating in a plurality of valve controllable ports opening on the combustion chamber defining surface of said first wall in spaced relation to each other and to the injector mounting opening, said member having a plurality of coolant receiving inlet ports spaced and opening peripherally of said lower jacket chamber, said inlet ports being connectable through said coolant circulating means to the outlet port from said upper chamber, said combustion chamber defining wall being tapered to a reduced wall thickness intermediate the several passage openings, the exhaust passage defining walls extending through said lower chamber each being ovate in cross section, and being of maximum wall thickness radially outwardly of said member and having a sector of minimum wall thickness inwardly thereof, and partition means extending radially within said lower chamber for equalizing and increasing velocity of coolant flow inwardly of the combustion chamber defining wall between the passage defining walls and upwardly through said partition opening into said upper jacket chamber, said partition means and the tapering of said combustion chamber and said passage defining walls cooperating with the increasing inward coolant flow velocity to increase heat transfer inwardly of said wall portion thereby equalizing the cooling of the several valve ports and minimizing the expansive and contractive thermal stress loads imposed on the combustion chamber defining wall intermediate the several valve ports.

8. A cylinder head for an internal combustion engine, said cylinder head defining a coolant receiving jacket compartment and having a combustion chamber defining wall, a wall portion adapted to mount a fuel injector extending through said jacket compartment and opening on said combustion chamber defining wall, said member having a partition wall extending transversely within said member in closely spaced parallel relation to said combustion chamber wall and dividing said jacket compartment into a flow restricting lower jacket chamber and an upper relatively unrestricted jacket chamber, said member having a coolant outlet port opening to said upper jacket chamber and connectable to coolant circulating means, said partition wall having an opening therethrough spacedly embracing the injector mounting wall portion, said member having exhaust passage defining walls extending through said jacket compartment and spacedly embracing a portion of said injector mounting wall portion to define a restricted coolant passage between said jacket chambers, said passage defining walls terminating in a plurality of valve controllable ports opening on the combustion chamber surface of said wall in equispaced relation to each other and to the injector mounting opening, said member having a plurality of coolant receiving inlet ports spaced and opening peripherally of said lower jacket chamber, said inlet ports being connectable through said coolant circulating means to the outlet port from said upper chamber, said combustion chamber wall being tapered to portions of reduced thickness intermediate the several passage defining walls, and partition means extending radially of the cylinder head between said passage defining walls and subdividing said lower chamber to equalize increasing velocity of coolant flow inwardly of the lower jacket chamber over the combustion chamber wall portions between the passage defining walls and upwardly through said partition opening into said upper jacket chamber, said partition means and the tapering of said combustion chamber wall cooperating with the increasing inward coolant flow velocity to increase heat transfer inwardly of said wall portion thereby equalizing the cooling of the several valve ports and minimizing the expansive and contractive thermal stress loads imposed on the combustion chamber defining wall portions intermediate the several valve ports.

9. A cylinder defining member of an internal combustion engine, said member defining a coolant jacket compartment and having a combustion chamber defining wall, passage defining walls extending through said jacket compartment and terminating in a plurality of valve controllable ports spacedly opening on the combustion chamber surface of said wall, said member having a coolant outlet port opening centrally of said valve ports and connectable to coolant circulating means and having a plurality of coolant inlet ports spaced and opening peripherally of said jacket compartment, said inlet ports being connectable through said coolant circulating means to said outlet port, said wall being tapered radially inwardly of said jacket compartment to a reduced wall thickness intermediate the several passage openings and the passage defining walls being varied in cross sectional wall thickness in a plane parallel to said combustion chamber surface, being of maximum wall thickness radially outwardly of the combustion chamber defining wall and of minimum wall thickness inwardly thereof, and flow directly radially extending partition means within said jacket compartment for equalizing and increasing the velocity of coolant flow inwardly over the combustion chamber defining wall between the passage defining walls, said partition means and the tapering of said combustion chamber defining wall and said passage defining walls cooperating with the increasing inward coolant flow velocity to increase heat transfer inwardly of said wall portion thereby equalizing the cooling of the several valve ports and minimizing the expansive and contractive thermal stress loads imposed on the combustion chamber defining wall intermediate the several valve ports.

10. A member of an internal combustion engine defining a coolant jacket compartment and having a combustion chamber defining wall, said member having exhaust passage defining walls extending through said jacket compartment and terminating in a plurality of valve controllable ports opening through said combustion chamber defining wall in spaced relation to each other, partition wall means extending in closely spaced parallel relation to said combustion chamber defining wall and intersecting said passage defining walls, said partition means dividing said jacket compartment into a flow restricting lower jacket chamber and an upper relatively unrestricted jacket chamber and having an interconnecting opening therethrough centrally of said passage defining walls, said upper chamber having an outlet port connectable to coolant circulating means, said member having a plurality of coolant inlet ports spaced and opening into the outer periphery of the lower jacket chamber, said coolant inlet ports being connectable through said coolant circulating means to the outlet port from said upper chamber and adapted to introduce coolant into said lower jacket chamber, said passage defining walls within said lower chamber being varied in cross sectional wall thickness in a plane parallel to said combustion chamber defining wall, being of greater wall thickness radially outwardly of the combustion chamber defining wall and having sectors of reduced wall thickness radially inwardly thereof, said passage defining walls cooperating with said partition wall means and the combustion chamber wall to equalize and increase the velocity of coolant flowing inwardly therebetween, thereby increasing heat transfer inwardly of said wall and minimizing the expansive and contractive thermal stress loads imposed on the wall portion intermediate the several valve ports.

11. A combustion chamber defining member of an internal combustion engine comprising a first combustion chamber wall and a second wall closely spaced therefrom and defining a coolant chamber therebetween, at least one passage defining wall extending between the first and second walls through the jacket chamber and terminating in a port opening through the first wall, coolant inlet and outlet port means opening to the coolant chamber and connectable to coolant circulating means to provide coolant flow through said chamber compartment, and said first wall being tapered in wall thickness with respect to coolant flow toward said passage defining wall and the heat of combustion applied thereto so as to equalize the peripheral cooling of the passage terminating port and to minimize the expansive and contractive thermal stress loads imposed on the combustion exposed surface of said first wall.

12. In an internal combustion engine, a cylinder defining member comprising a first wall forming a combustion chamber wall, a second wall extending in closely spaced parallel relation to said first wall and defining a coolant chamber therewith, a plurality of passage defining walls extending through the cooling chamber between said first and second walls and terminating in a plurality of spaced valve controllable ports opening to the combustion chamber through said wall, coolant inlet and outlet port means opening to the coolant chamber and connectable to coolant circulating means to the coolant outlet port and cooperating with said first and second walls to provide coolant flow through said coolant jacket compartment of increased velocity between said passage defining walls, and said passage defining walls being varied in cross sectional configuration in a plane parallel to said combustion chamber wall to vary in wall thickness with respect to coolant flow and the heat of combustion applied to said first wall so as to equalize the cooling of the several valve controllable ports thereby minimizing the expansive and contractive thermal stresses imposed on the combustion chamber wall.

References Cited in the file of this patent
UNITED STATES PATENTS

| | | |
|---|---|---|
| 1,107,946 | Hesselman | Aug. 18, 1914 |
| 2,739,579 | Ware et al. | Mar. 27, 1956 |
| 2,858,815 | Burrows et al. | Nov. 4, 1958 |